United States Patent [19]

Hockney et al.

[11] Patent Number: 4,900,962
[45] Date of Patent: Feb. 13, 1990

[54] MAGNETIC TRANSLATOR BEARINGS

[75] Inventors: Richard L. Hockney, Lynnfield; James R. Downer, Canton; David B. Eisenhaure, Hull; Timothy J. Hawkey, Brookline; Bruce G. Johnson, Nahant, all of Mass.

[73] Assignee: SatCon Technology Corporation, Cambridge, Mass.

[21] Appl. No.: 298,644

[22] Filed: Jan. 18, 1989

[51] Int. Cl.[4] .............................................. F16C 39/06
[52] U.S. Cl. ................................. 310/90.5; 104/281; 104/284; 324/207.24
[58] Field of Search ......................... 310/90.5, 12, 13; 369/44; 324/208; 104/281, 282, 283, 284; 318/135

[56] References Cited

U.S. PATENT DOCUMENTS

| | | | |
|---|---|---|---|
| 3,804,022 | 4/1974 | Schwarzler | 104/284 |
| 3,851,594 | 12/1974 | Schwarzer | 104/284 |
| 3,882,790 | 5/1975 | Winkle | 104/281 |
| 3,924,538 | 12/1975 | Breitling | 104/281 |
| 3,937,148 | 2/1976 | Simpson | 310/90.5 |
| 4,244,629 | 1/1981 | Habermann | 310/90.5 |
| 4,408,313 | 12/1980 | Musha | 369/44 |
| 4,473,259 | 9/1984 | Goldowsky | 310/90.5 |
| 4,817,533 | 4/1989 | Azukizawa | 104/284 |

FOREIGN PATENT DOCUMENTS

| | | | |
|---|---|---|---|
| 2139506 | 2/1973 | Fed. Rep. of Germany | 310/90.5 |
| 2360412 | 6/1975 | Fed. Rep. of Germany | 310/90.5 |
| 2401625 | 7/1975 | Fed. Rep. of Germany | 310/90.5 |

Primary Examiner—R. Skudy
Attorney, Agent, or Firm—Joseph S. Iandiorio

[57] ABSTRACT

A magnetic bearing system for enabling translational motion includes a carriage and a shaft for movably supporting the carriage; a first magnetic bearing fixed to one of the carriage and shaft and slidably received in a first channel of the other of the carriage and shaft. The first channel is generally "U" shaped with two side walls and a back wall. The magnetic bearing includes a pair of spaced magnetic pole pieces, each pole piece having a pair of electromagnetic coils mounted on poles on opposite ends of the pole piece proximate the side walls, and a third electromagnetic coil mounted on a pole of the pole piece proximate the backwall; a motion sensor for sensing translational motion along two axes and rotationally about three axes of the carriage and shaft relative to each other; and a correction circuit responsive to the sensor for generating a correction signal to drive the coils to compensate for any misalignment sensed between the carriage and the shaft.

13 Claims, 6 Drawing Sheets

MAGNETIC TRANSLATOR BEARINGS

This invention was made with Government support under contract NAS5-30058 awarded by NASA. The Government has certain rights in this invention.

FIELD OF INVENTION

This invention relates to an improved magnetic bearing system for translational motion, and more articularly to such a bearing system which directly replaces air bearings in present optical disk data-storage devices.

BACKGROUND OF INVENTION

Non-contact bearings are essential in the support and positioning of optical read/write heads of high-density, high-data rate, high-performance optical disks. Air bearings are used for this purpose in a number of applications, but they suffer from a number of shortcomings. One problem is that they need a complete pneumatic system—pumps, valves, seals, conduits—for their operation. Another problem is that they require air, an element not readily available in space applications where high-performance optical disk data-storage systems are the technology of choice. In any environment the air supply system adds significant cost, size and weight to the bearing package and introduces the inherent reliability problems associated with pneumatic systems components such as pumps and seals. The air bearings themselves are difficult and expensive to manufacture because of the small tolerance required, in the order of one ten thousandth of an inch. Air bearings are highly susceptible to contaminants: a particle of dust can interfere with air gaps as small as four ten-thousandths of an inch and clog pores of the graphite or other diffusive coating.

SUMMARY OF INVENTION

It is therefore an object of this invention to provide an improved non-contact bearing for translational motion.

It is a further object of this invention to provide such a bearing which permits precise and accurate movement and positioning of the parts.

It is a further object of this invention to provide such an improved bearing which is relatively easy to manufacture, low in cost and weight, small in size, and has none of the problems associated with air bearing systems.

It is a further object of this invention to provide such a bearing which has good resistance to contamination problems and has relatively large manufacturing and operating tolerances.

It is a further object of this invention to provide such an improved bearing which uses a magnetic bearing system.

It is a further object of this invention to provide such an improved bearing which directly replaces air bearing systems in present high-performance optical read/write heads for optical disk data-storage devices.

This invention results from the realization that a truly effective magnetic bearing for replacing existing air bearings in optical storage devices can be achieved by employing the same shaft and carriage assembly using magnetic bearings and channels to precisely, gently and frictionlessly guide the carriage movement on the shafts.

This invention features a magnetic bearing system for enabling translational motion. There are carriage means and shaft means for movably supporting the carriage means. There is at least a first magnetic bearing means fixed to one of the carriage and shaft means and slidably received in a first channel of the other of the carriage and shaft means. The first channel is generally "U" shaped, with two side walls and a back wall. The magnetic bearing means includes a magnetic bearing having a pair of spaced magnetic pole pieces, each pole piece having a pair of electromagnetic coils mounted on poles on opposite ends of the pole piece proximate the side walls, and a third electromagnetic coil mounted on a pole of the pole piece proximate the back wall. There are means for sensing the motion, transitionally along two axes and rotationally about three axes, of the carriage means and shaft means relative to each other. Means responsive to the means for sensing generate correction signals to drive the coil, to compensate for any misalignment sensed between the carriage and shaft means.

In preferred embodiments the pair of electromagnetic coils mounted on the poles at opposite ends of the pole piece are electrically connected in series. The first magnetic bearing means may include permanent magnet means associated with the pole pieces for establishing a steady biasing magnetic field in the pole pieces. The system may include a second magnetic bearing fixed to one of the carriage means and shaft means and slidably received in a second channel in the other of the carriage and shaft means. The second channel also has two side walls and a back wall. The two channels face in the opposite direction. The second magnetic bearing means may include a pair of spaced pole pieces, each pole piece having a pair of electromagnetic coils mounted on poles on opposite ends of the pole piece proximate the side wall, and a third electromagnetic coil mounted on the pole of the pole piece proximate the back wall. The pairs of electromagnetic coils mounted on the pole pieces of the second magnetic bearing means at opposite ends of the pole pieces may be electrically connected in series. The second magnetic bearing means may include permanent magnet means associated with the pole pieces for establishing a steady biasing magnetic field in the pole pieces. The third electromagnetic coil mounted on the pole of each pole piece in the first magnetic bearing means may be electrically connected in series with the corresponding third electromagnetic coil means mounted on a pole of each pole piece in the second magnetic bearing means. The channel means may be in the shaft means and the bearing means may be in the carriage means, or conversely.

DISCLOSURE OF PREFERRED EMBODIMENT

Other objects, features and advantages will occur to those skilled in the art from the following description of a preferred embodiment and the accompanying drawings, in which.

Figure 1:
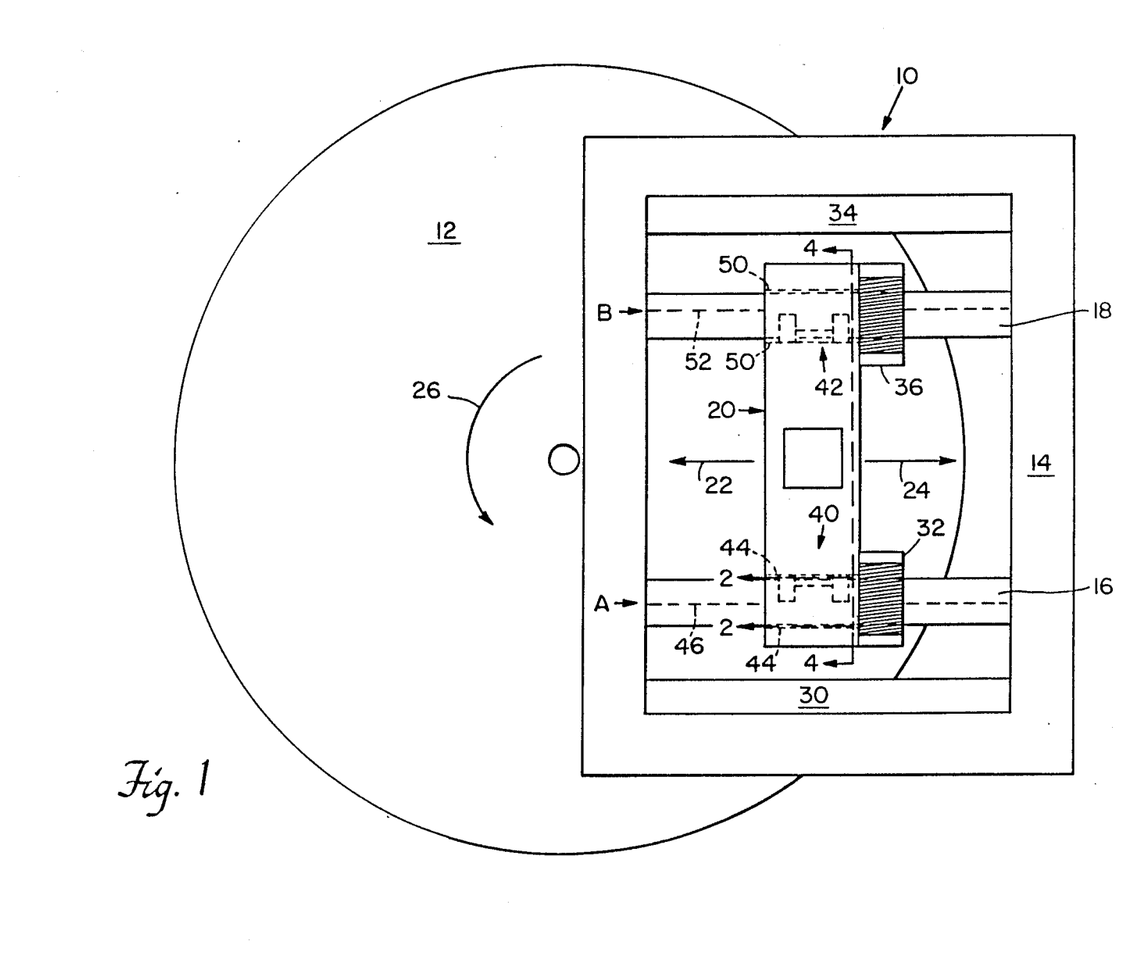
FIG. 1 is a diagrammatic top plan view of an optical read/write head for an optical disk data-storage device using the magnetic bearings according to this invention.

There is shown in FIG. 1 a read/write head assembly 10 for an optical storage disk 12. Read/write head assembly 10 includes an iron frame 14 suspended across which are two iron shafts 16 and 18. A carriage 20 slides to and fro on shafts 18 and 20 in the direction indicated by arrows 22 and 24 radially back and forth across optical disk 12, which is rotating as indicated by arrow 26. Carriage 20 is driven by a pair of linear motors in a conventional manner. One linear motor is comprised of permanent magnet 30 which interacts with the current in coil 32 fixed to carriage 20. The second linear motor is comprised of permanent magnet 34 which interacts with the current in coil 36, also fixed to carriage 20. The magnetic fields between the permanent magnets 30 and 34 and the current in their respective coils 32 and 36 generate Lorentz forces which move the carriage back and forth on shafts 16 and 18 in a conventional manner.

In this particular embodiment there are two magnetic beaings 40 and 42 which may be referred to as first and second magnetic bearing means respectively and are included in the magnetic bearing system. Magnetic bearing 40 is fixed to carriage 20 in passageway 44, where it is received in channel 46 in shaft 16 which forms a first assembly A. Magnetic bearing 42 is fixed to carriage 20 in passageway 50 and is received in channel 52 in shaft 18 to constitute assembly B. Although the channels are shown disposed in the shafts and the magnetic bearings are shown attached to the carriage, this is not a necessary limitation of the invention. The bearings can be on the shafts and the channels could be formed in the carriage, or one bearing could be formed on the carriage and one on a shaft with the channels in complementary positions.

Figure 2:
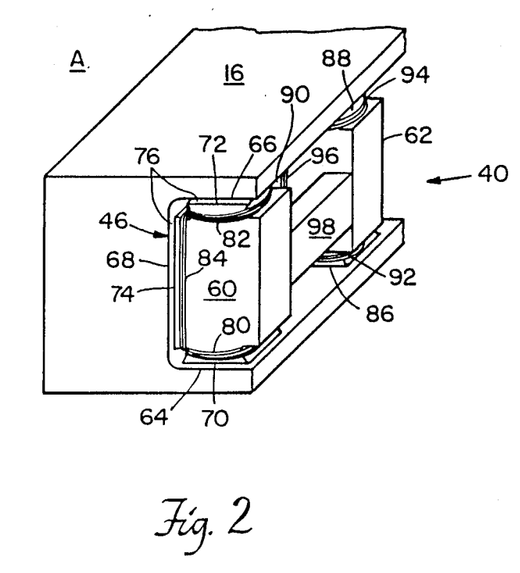
FIG. 2 is a sectional view taken along lines 2—2 of FIG. 1, extended into a three-dimensional diagram showing one of the magnetic bearings of FIG. 1 according to this invention.

Assembly A is illustrated in greater detail in FIG. 2, where bearing 40 is shown slidably received in channel 46 of shaft 16. Bearing 40 includes two pole pieces 60 and 62. Channel 46 includes two side walls 64 and 66, and a back wall 68 and is therefore generally "U"-shaped. Pole piece 60 includes a pair of poles 70 and 72 on opposite ends of pole piece 60 facing side walls 64 and 66. A third pole piece 74 faces back wall 68. The gap 76 between the poles and channel 46 is typically on the order of ten to twenty thousandths of an inch. A pair of coils 80, 82 are mounted on poles 70 and 72, and a third coil 84 is mounted on pole 74. The second pole piece 62 includes similar pole pieces 86, 88 and 90 with similar coils 92, 94, and 96.

Figure 3:
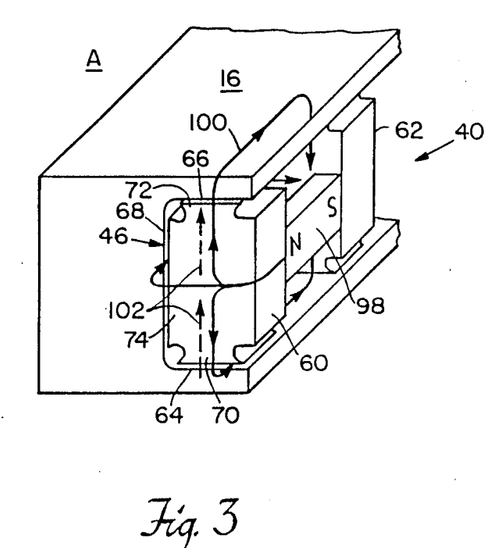
FIG. 3 is a view similar to that of FIG. 2 illustrating a steady state magnetic field provided by a permanent magnet in the magnetic bearing.

A permanent magnet 98 may be provided to establish a steady magnetic field through the pole pieces and channel, as shown in FIG. 3, where the steady field provided by magnet 98 is shown in solid lines 100 and the field provided by the coils 80 and 82 is shown in dashed lines 102. In FIG. 3 the coils have been eliminated for clarity. It can be seen here that while tee two fields add in pole 72 and side wall 66, they subtract in pole 70 and side wall 64 to provide the adjusting magnetic forces, as is explained hereafter. Although in this embodiment a permanent magnet is shown as part of a magnetic bearing, this is not a necessary limitation of the invention. A permanent magnet is used when a linear, low-power force adjustment is desirable. In applications where that is not required, the magnet is not used and corrections are applied only through the electromagnetic coil.

Figure 4:
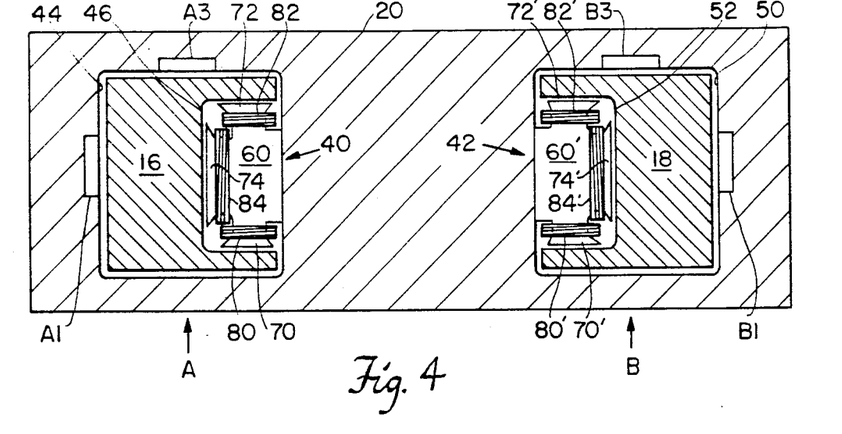
FIG. 4 is a diagrammatic cross-sectional view taken along lines 4—4 FIG. 1.

The configurations of assemblies A and B with respect to carriage 20 are shown in section in FIG. 4, which illustrates that magnetic bearings 40 and 42 fixed to carriage 20 are slidably received in channels 46 and 52 of shafts 16 and 18, which are themselves slidably receivable in passageways 44 and 50 of carriage 20. Magnetic force is applied by the permanent magnet and by the coils so that the coils 84, 84', shown, and 96 and 96', not shown, can create offsetting magnetic forces that balance the carriage support from left to right in FIG. 4 in the same way that coils 80, 82, 80', 82', shown, and 92, 94, 92', 94', not shown, perform in the vertical direction as shown in FIG. 4. To accomplish this, channels 46 and 52 face in opposite directions.

Figure 5:
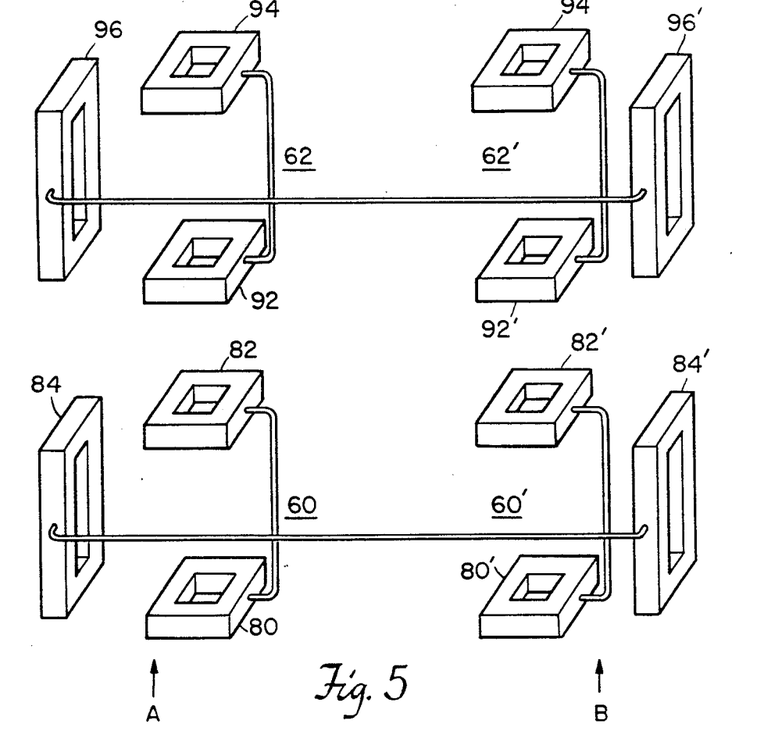
FIG. 5 is an exploded three-dimensional view showing the relative positioning and interconnection of the coils illustrated in 1, 2 and 4.

The connection of the coils is shown in FIG. 5. In assembly A, coils 80 and 82 of pole piece 60 are connected in series, and coils 92 and 94 of pole piece 62 are connected in series. Similarly, in assembly B coils 80' and 82' of pole piece 60' are connected in series, and coils 92' and 94' of pole piece 62' are connected in series. Coil 84 of pole piece 60 is also connected in series with coil 84' of pole piece 60', and coil 96 of pole piece 62 is connected in series with coil 96' of pole piece 62' While this is the preferred electrical interconnection, it is not a necessary limitation, as each of the coils could be energized individually to provide the proper alignment correction between carriage 20 and shafts 16 and 18.

Figure 6:
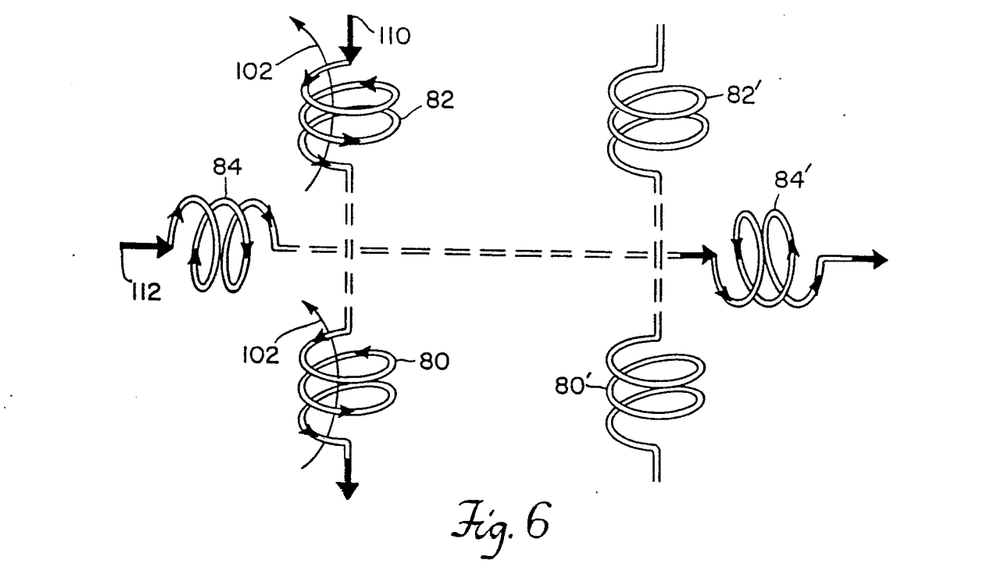
FIG. 6 schematic of the coil winding interconnections and current flows of one of the groups of coils of FIG. 5.

The energization of the coils as connected in FIG. 5 is illustrated schematically in FIG. 6. Current flowing into coil 82 at terminal 110 flows in the same direction in coil 82 and in coil 80, creating the magnetic fields 102 which combine with the field 100 of the permanent magnet, FIG. 3, to provide the necessary righting forces and moments to keep the carriage and shafts properly aligned. Conversely, coils 84 and 84', FIG. 6, are interconnected so that a current introduced at terminal 112 flows in the opposite direction in coils 84 and 84', to provide the necessary magnetic balancing forces.

Figure 7:
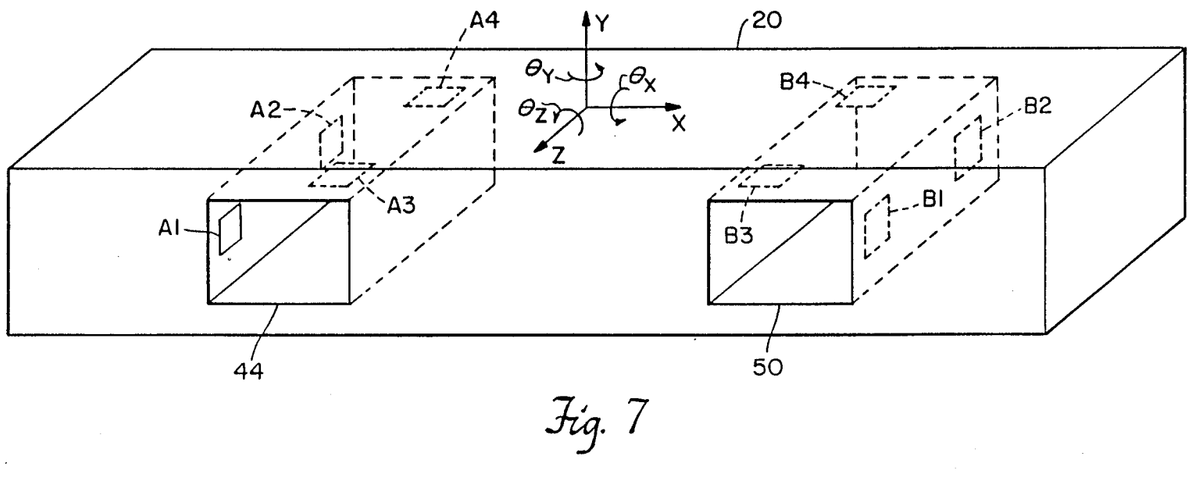
FIG. 7 enlarged three-dimensional view of the carriage of FIG. 1 illustrating the location of the position sensors.

In this arrangement, the relative position of shafts 16 and 18 and carriage 20 is monitored by sensors A1, A2, A3, and A4, FIG. 7, in passageway 44, and sensors B1, B2, B3 and B4 in passageway 50. These sensors are capacitive sensors such as concentric conductive rings or similar elements. With these sensors, the translational motion in the lateral and vertical directions X and Y, respectively, and the rotational motions about the X axis, Y axis and Z axis, $\theta x$, $\theta_y$, $\theta_z$, may be determined, and correction signals developed where necessary to realign carriage 20 with shafts 16 and 18.

Figure 8:
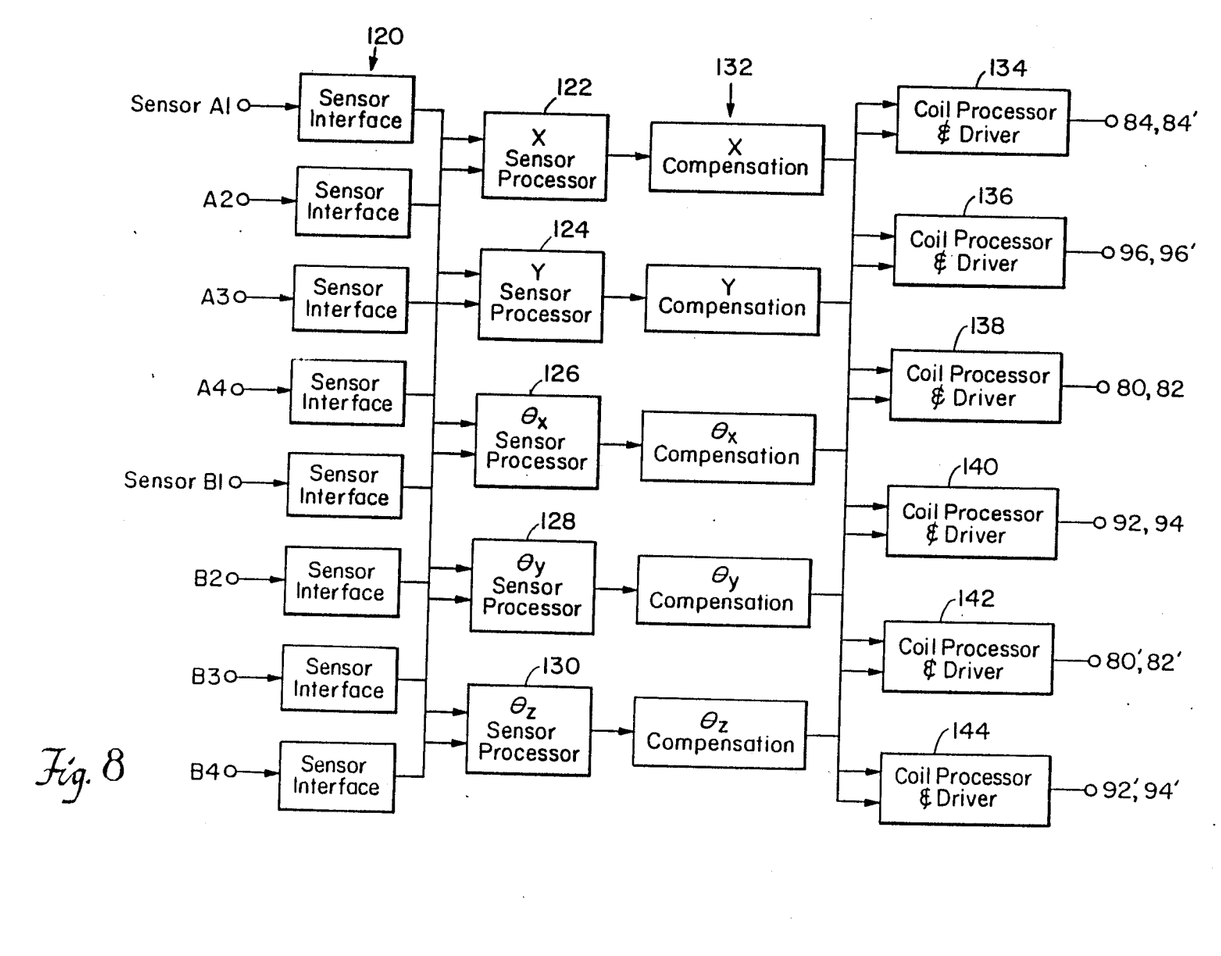
FIG. 8 schematic block diagram of the correction circuit which senses the position of the carriage and shaft relative to one another and provides compensating signals to the coils to correct any misalignment.

The signals from sensors A1–A4 and B1–B4 are delivered to sensor interface circuits 120, FIG. 8, where they are filtered, shaped and amplified, and delivered to sensor processor circuits 122, 124, 126, 128, and 130 in the combinations as shown in Table I.

TABLE I

|    | X (122) | Y (124) | $\theta_x$ (126) | $\theta_y$ (128) | $\theta_z$ (130) |
|----|---------|---------|------------------|------------------|------------------|
| A1 | x       |         |                  | x                |                  |
| A2 | x       |         |                  | x                |                  |
| A3 |         | x       | x                |                  | x                |
| A4 |         | x       | x                |                  | x                |
| B1 | x       |         |                  | x                |                  |
| B2 | x       |         |                  | x                |                  |
| B3 |         | x       | x                |                  | x                |
| B4 |         | x       | x                |                  | x                |

After these signals have been resolved, conventional loop compensation is introduced by compensation circuits 132, and signals are delivered to the coil processors and drives 134, 136, 138, 140, 142 and 144 in the combinations shown in Table II to provide the necessary correction signals to the coil combinations.

TABLE II

|              | X (122) | Y (124) | $\theta_x$ (126) | $\theta_y$ (128) | $\theta_z$ (130) |
|--------------|---------|---------|------------------|------------------|------------------|
| 84,84' (134) | x       |         |                  | x                |                  |
| 96,96' (136) | x       |         |                  | x                |                  |
| 80,82 (138)  |         | x       | x                |                  | x                |
| 92,94 (140)  |         | x       | x                |                  | x                |
| 80',82' (142)|         | x       | x                |                  | x                |
| 92',94' (144)|         | x       | x                |                  | x                |

Figure 9:
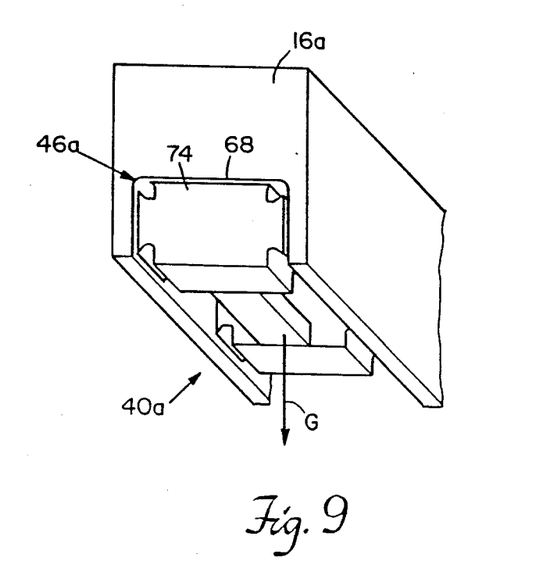
FIG. 9 an axonometric view of a bearing similar to that shown in FIG. 2, arranged for use singly.

Although in this embodiment the magnetic bearing system shown is employing two sets of magnetic bearings, that is not a necessary limitation of the invention. As shown in FIG. 9, a single bearing 40a could be used in combination with a shaft 46a in channel 16a, where the force opposing the magnetic force between poles 74 and back wall 68 is not a magnetic force generated by another magnetic bearing, but rather is the force of gravity indicated at arrow G.

Although specific features of the invention are shown in some drawings and not others, this is for convenience only as each feature may be combined with any or all of the other features in accordance with the invention.

Other embodiments will occur to those skilled in the art and are with the following claims:

What is claimed is:

1. A magnetic bearing system for enabling translational motion comprising:
   carriage means;
   shaft means for movably supporting said carriage means;
   first magnetic bearing means fixed to one of said carriage and shaft means and slidably received in first channel means of the other of said carriage and shaft means; said first channel means being generally "U" shaped with two side walls and a back wall, said magnetic bearing means including a magnetic bearing having a pair of spaced magnetic pole pieces, each pole piece having a pair of electromagnetic coil means mounted on poles on opposite ends of said pole piece proximate said side walls and third electromagnetic coil means mounted on a pole of the pole piece proximate said back wall;
   means for sensing motion, translationally along two axes and rotationally about three axes, of the carriage means and shaft means relative to each other; and
   means, responsive to said means for sensing, motion for generating correction signals to drive said coils to compensate for any misalignment sensed between the carriage means and shaft means.

2. The magnetic bearing system of claim 1 in which said pair of electromagnetic coil means mounted on said poles at opposite ends of a pole piece are electrically connected in series.

3. The magnetic bearing system of claim 1 in which said first magnetic bearing means includes permanent magnet means associated with said pole pieces for establishing a steady biasing magnetic field in said pole pieces.

4. The magnetic bearing system of claim 1 further including a second magnetic bearing means fixed to one of said carriage means and shaft means and slidably received in a second channel in the other of said carriage means and shaft means, said second channel having two side walls and a back wall and facing in the opposite direction to said first channel.

5. The magnetic bearing system of claim 4 in which said second magnetic bearing includes a pair of spaced pole pieces, each pole piece having a pair of electromagentic coils mounted on poles on opposite ends of said pole piece proximate said side walls and a third electromagnetic coil means mounted on a pole of the pole piece proximate said back wall.

6. The magnetic bearing system of claim 5 in which said pairs of electromagnetic coils mounted on said pole pieces of said second magnetic bearing means at opposite ends of said pole pieces are electrically connected in series.

7. The magnetic bearing system of claim 4 in which said second magnetic bearing means includes permanent magnet means associated with said pole pieces for establishing a steady biasing magnetic field in said pole pieces.

8. The magnetic bearing system of claim 5 in which said third electromagnetic coil means mounted on a pole of each pole piece in the first magnetic bearing means is electrically connected in series with the corresponding said third electromagnetic coil means mounted on a pole of each pole piece in said second magnetic bearing means.

9. The magnetic bearing system of claim 1 in which said first channel means is in said shaft means and said first bearing means is fixed to said carriage means.

10. The magnetic bearing system of claim 4 in which said second channel means is in said shaft means and said second bearing means is fixed to said carriage means.

11. A magnetic bearing system for enabling translational motion comprising:
   carriage means;
   shaft means for movably supporting said carriage means;
   two magnetic bearing means, each of said magnetic bearing means being fixed to one of said carriage and shaft means and slidably received in channel means of the other of said carriage and shaft means; said channel means being generally "U" shaped with two side walls and a back wall, and each said magnetic bearing means including a magnetic bearing having a pair of spaced magnetic pole pieces, each pole piece having a pair of electromagnetic coil means mounted on poles on opposite ends of said pole piece proximate said side walls and having a third electromagnetic coil means mounted on a pole of the pole piece proximate said back wall;

means for sensing motion, translationally along two axes and rotationally about three axes, of the carriage means and shaft means relative to each other; and means, responsive to said means for sensing, motion for generating correction signals to drive said coils to compensate for any misalignment sensed between the carriage means and shaft means.

12. The magnetic bearing system of claim 11 in which said pairs of electromagnetic coils mounted on said pole pieces of said magnetic bearing means at opposite ends of said pole pieces proximate said side walls are electrically connected in series.

13. The magnetic bearing system of claim 11 in which said third electromagnetic coil means mounted on a pole of a pole piece on one said magnetic bearing means is electrically connected in series with the corresponding said third electromagnetic coil means mounted on a pole of the pole piece of the other said magnetic bearing means.

* * * * *